United States Patent [19]

Shine

[11] 4,323,724
[45] Apr. 6, 1982

[54] UNITARY INSERTABLE SELF-ANCHORING POKE-THRU WIRING DEVICE

[76] Inventor: William P. Shine, 3989 Park Ave., Fairfield, Conn. 06430

[21] Appl. No.: 145,715

[22] Filed: May 1, 1980

[51] Int. Cl.³ .............................................. H02G 3/22
[52] U.S. Cl. ....................................... 174/48; 169/48
[58] Field of Search ................ 174/48; 169/48; 52/221

[56] References Cited

U.S. PATENT DOCUMENTS

| | | | |
|---|---|---|---|
| 3,803,341 | 4/1974 | Klinkman et al. | 174/48 |
| 3,995,102 | 11/1976 | Kohaut | 174/48 |
| 4,091,231 | 5/1978 | Sotolongo | 174/48 |
| 4,243,835 | 1/1981 | Ehrenfels | 174/48 |

*Primary Examiner*—B. A. Reynolds
*Assistant Examiner*—D. A. Tone
*Attorney, Agent, or Firm*—Robert H. Ware; Melvin I. Stoltz; Alfred A. Fressola

[57] ABSTRACT

A unitary insertable self-anchoring poke-thru wiring device for building construction includes a tombstone outlet box dimensioned to overlie and conceal a standard floor aperture opening into an occupied space, hollow elongated conduit means extending through the aperture, a narrow elongated junction box dimensioned to pass lengthwise through the aperture and anchored to the conduit means, fire-retardant means centrally anchored to the hollow conduit means positioned inside the aperture, and a conically-dished resilient spring washer encircling and anchored to the hollow conduit means adjacent to the fire retardant means and having its conical surface concavely diverging toward the outlet box, with its periphery notched and dimensioned for wedging engagement in the standard aperture, the poke-thru wiring device thus being adapted for unitary insertion from the occupied space into the aperture, with the resilient spring washer wedgingly engaging the internal wall of the standard aperture retaining the wiring device captively installed therein.

6 Claims, 6 Drawing Figures

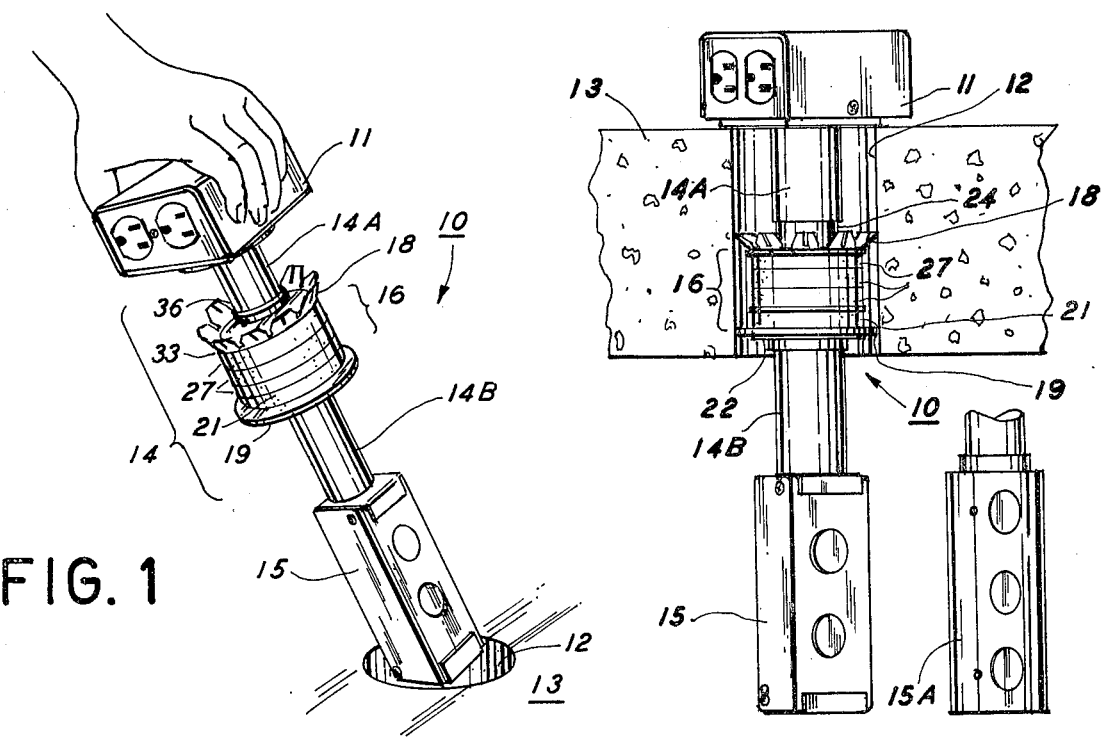
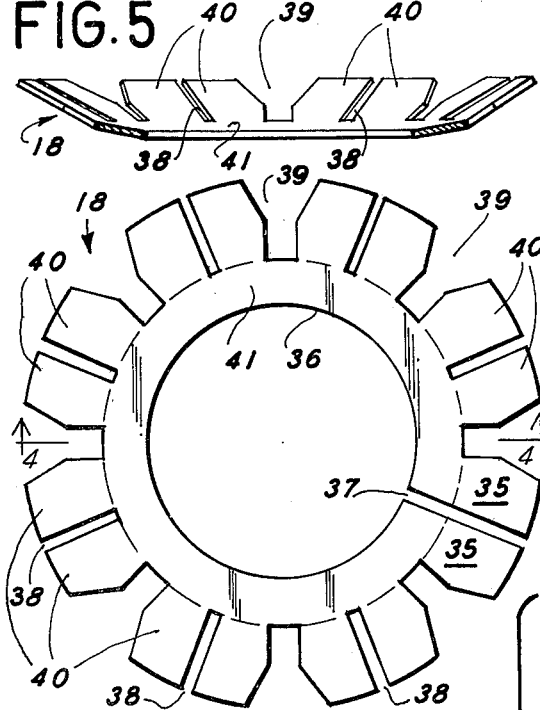
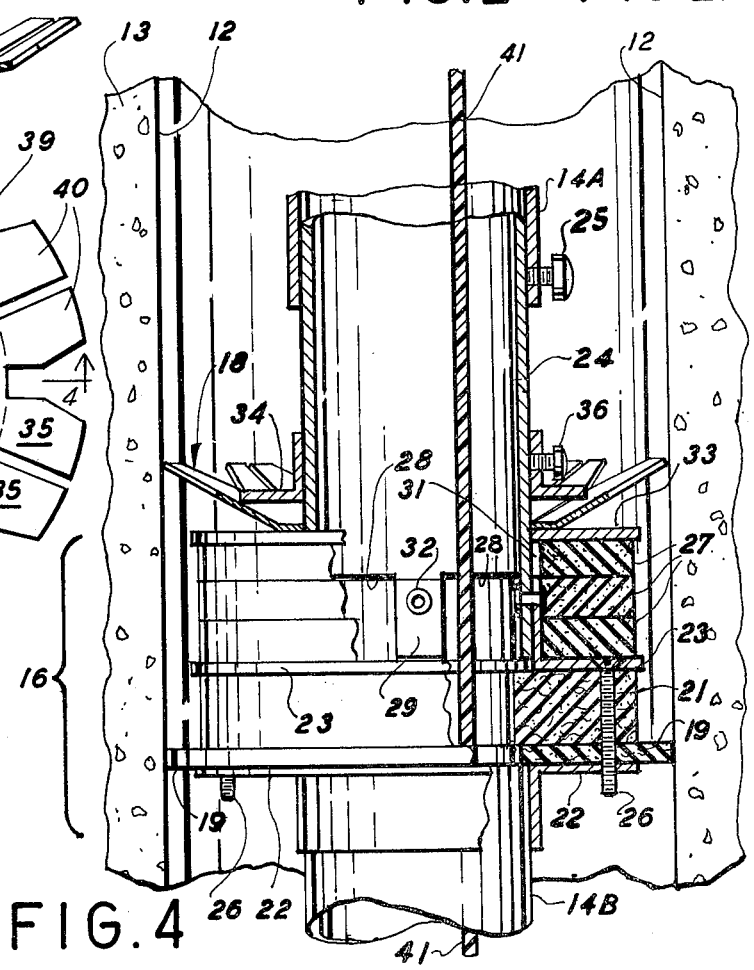
FIG. 1  FIG. 2  FIG. 2A  FIG. 3  FIG. 4  FIG. 5

UNITARY INSERTABLE SELF-ANCHORING POKE-THRU WIRING DEVICE

TECHNICAL FIELD This invention relates to "poke-thru" wiring devices providing electrical power and communication outlets and connections for the work spaces of a building via openings provided in the building floor, such as round cylindrical openings formed in the poured concrete floors of schools and office buildings. More specifically, the poke-thru devices of the present invention incorporate fire and heat resistant insulation material blocking the passage of heat and flame through the floor openings, and they are provided with self-captivating gripping devices which permit a unitary poke-thru wiring device to be inserted from above through a floor opening and to anchor itself in that opening permanently, exposing a depending junction box below the floor and above the underlying suspended or hung ceiling for subsequent electrical wiring connections during the wiring of the building. Insertion of the unitary poke-thru wiring devices of the present invention from above eliminates the need for cooperating electricians to work in tandem above and below the floor openings to achieve installation of the poke-thru devices, and thus significantly reduces labor costs.

BACKGROUND ART

Various different wiring devices for delivering power or communications connections to floor-mounted plug-in receptacles have been proposed in many different patents. U.S. Pat. Nos. 1,869,841, 3,081,896, 3,166,633, 3,318,476, 3,972,579 and 3,751,576 all relate to various products of this kind. Heat and fire resistant materials blocking the passage of smoke, flame or heat through wall or floor openings in and around electrical wiring receptacles and their associated raceways have also been mentioned in various patents such as U.S. Pat. Nos. 3,255,556, 3,455,850, 3,336,153, 2,279,791 and German Offenlegungsschrift No. 2,162,251 dated June 20, 1973 Offenlegungstag. Incorporation of ceramic fiber products as fire resistant materials in floor aperture mounted poke-thru wiring devices was suggested in U.S. Pat. No. 3,803,341. The use of intumescent expanding or foaming material such as sodium silicate or other water-containing alkali metal silicates in specified shapes and orientations, to swell in response to heat or flame, blocking the thru floor aperature and retarding the passage of smoke, heat or flame therethrough in poke-thru wiring devices is suggested in U.S. Pat. Nos. 3,395,102 and 4,099,020.

These prior conventional poke-thru wiring devices have customarily required the cooperation of two installing electricians, one working below the floor and one working above the floor to raise a junction box and tubular hollow conduit column inserted from below upwardly through the floor opening to be assembled with downwardly extending portions of a "tombstone" receptacle mounted above the floor opening and standing above the floor level. After assembly, a cover or housing has customarily been assembled to complete the tombstone receptacle installation.

Accordingly, there has been a long standing need for a unitary insertable poke-thru wiring device capable of installation from above the floor which could be inserted and lowered into place and which would then anchor itself in position without the attention of any electrician or installer below the floor.

DISCLOSURE OF THE INVENTION

The unitary insertable poke-thru wiring devices of the present invention incorporate an uppermost tombstone multi-receptacle unit to be positioned above the floor level, providing access for communication wiring and plug-in power cord connections in standard receptacles, and having a depending raceway conduit housing terminating in a depending junction box. The junction box is preferably slim and vertically elongated to permit its downward insertion from above the floor through standard size round cylindrical floor openings. The central portion of these unitary insertable poke-thru devices is provided with a heat and flame retarding assembly incorporating fibrous ceramic heat-insulating material and intumescent foaming heat-insulating material capable of expanding and filling the floor opening as well as interior spaces in the raceway conduit assembly.

This heat-retarding material is preferably adjustable for vertical positioning inside the cylindrical floor opening and close to the lower end of that opening. Surmounting the heat-retarding material is a self-anchoring "captivating" device, preferably taking the form of a multiply notched spring washer disc retained on the conduit assembly by an anchoring flange. This self-anchoring captivating spring washer is sized to provide an external diameter larger than the internal diameter of the thru-floor opening and its dished raked peripheral tab edges permit it to flex and scrape along the interior walls of the opening during downward insertion of the unitary poke-thru wiring device. After insertion, however, the upwardly raked peripheral flanges or tabs of this dished spring washer serve as barbs to prevent the upward withdrawal of the assembly from the opening through the floor, anchoring the device firmly in position.

OBJECTS OF THE INVENTION

Accordingly a principal object of the present invention is to provide unitary insertable poke-thru wiring devices capable of downward insertion and installation through preformed openings in a building floor by a single installer, requiring no additional assistance.

Another object of the invention is to provide unitary insertable poke-thru wiring devices of the above character which are self-contained, requiring no additional parts to be installed, mounted or added from below the floor after insertion.

Still another object of the invention is to provide such unitary insertable poke-thru wiring devices of this character provided with self-anchoring means securing the inserted device captive through the floor opening and anchoring it firmly against displacement or removal.

A further object of the invention is to provide split, notched ring-shaped resilient dished spring washer devices which are fabricated, dimensioned and bent into a dished configuration capable of anchoring insertable poke-thru devices securely in position in through the floor openings.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings.

BRIEF DESCRIPTION OF THE DRAWINGS

FIG. 1 is a perspective view of a unitary insertable poke-thru wiring device of the present invention illustrated during its insertion through the floor opening by the installing electrician;

FIG. 2 is a fragmentary cross-sectional side elevation view of the unitary insertable poke-thru wiring device of the present invention inserted through the floor opening and self-anchored therein;

FIG. 2A is a corresponding fragmentary side elevation view showing an alternative form of vertically elongated cylindrical junction box in a modified embodiment of the invention.

FIG. 3 is a top plan view of the flat blank for the self-anchoring captivating resilient spring washer incorporated in the device of the present invention;

FIG. 4 is a similarly enlarged fragmentary cross-sectional side elevation view of the fire retarding and heat resistant means centrally mounted on the poke-thru device of the present invention with one form of the overlying slotted resilient spring washer securing the device in self-anchored captive engagement inside the opening through the floor; and FIG. 5 is a corresponding enlarged cross-sectional side elevation view of a different and preferred form of the slotted resilient spring washer, in its conical dished configuration.

BEST MODE FOR CARRYING OUT THE INVENTION

As illustrated in the Figures, the unitary insertable poke-thru wiring devices of the present invention are vertically elongated wiring raceway conduit units having a lower end terminating in a vertically elongated junction box and an upper end terminating in a tombstone receptacle box dimensioned to overlie a standard hole through the building floor. These floor apertures are conventionally three inches in diameter and the minimum lateral dimensions of the tombstone receptacle box are greater than three inches, to overlie and conceal this opening.

The depending portions of the poke-thru wiring devices of the present invention are less than three inches in lateral dimension to permit downward telescoping insertion of the device from above through the opening in the floor. An exception to this lateral dimension limit is a self-anchoring washer described more fully below which is provided with an overall peripheral diameter slightly greater than the internal diameter through the floor opening, 3.46 inches for example, assuring scraping, wedging peripheral engagement of the slotted washer along the internal walls of the 3-inch diameter opening during installation, with consequent self-anchoring of the device in place where it is installed.

As shown in FIG. 1, the unitary insertable poke-thru wiring device 10 is provided with a tombstone receptacle box 11 laterally dimensioned to span and overlie a cylindrical vertical opening 12 extending through a floor 13. Depending from the underside of the tombstone receptacle box 11 and extending downward through the hole 12 is an electrical raceway conduit 14 incorporating an upper housing portion 14A and a lower housing portion 14B from which depends a tall thin junction box, which may be a rectangular box 15 (FIG. 2) or a cylindrical box 15A (FIG. 2A). The two housing portions 14A and 14B are secured together, supporting a heat-retarding and fire-resistant assembly 16 shown in detail in FIG. 4, which is positioned inside the lower end of hole 12 near the underside of the floor 13, forming the ceiling of the building story directly below, as shown in FIG. 2.

Surmounting the heat-resistant and fire retardant assembly 16 is a dished slotted resilient spring washer 18 best seen in FIGS. 3, 4 and 5, and dimensioned for wedging deflected engagement with the internal walls of the hole 12 passing through ceiling 13, and thereby anchoring the inserted poke-thru device 10 in the installed position shown in FIG. 2.

The heat resistant and fire retarding assembly 16 preferably comprises several different component parts, as shown in detail in FIG. 4. The lowermost portion of the assembly 16 in the preferred embodiment of the invention is a relatively thin flat ring-shaped disc of non-foaming ceramic insulating material such as Carborundum Company's "Fiberfrax" ceramic fiber "hot board" material, principally incorporating $Al_2O_3$ and $SiO_2$, forming about 90% of its composition, with much smaller amounts of $Fe_2O_3$, $Na_2O$ and $CaO$. The Carborundum Company's "Fiberfrax" ceramic fiber "paper" material is a similar composition, again primarily composed of $Al_2O_3$ and $SiO_2$, with much smaller amounts of $Na_2O$, $B_2O_3$ and $Fe_2O_3$. These non-foaming ceramic insulating materials form an excellent heat and smoke barrier interposed in the hole 12, and the lowermost disc 19 of the fire retardant assembly 16 preferably extends across the entire diameter of the hole 12, as indicated in FIG. 4.

Immediately overlying the disc 19 is a second thicker washer-shaped block or disc 21 of similar ceramic fiber non-foaming heat insulating material, and the two ceramic fiber discs 19 and 21 are preferably sandwiched between a pair of radial flanges, a lower flange 22 mounted by bolts or rivets at the upper end of lower housing conduit section 14B and protruding radially outward therefrom, and an upper flange 23 protruding radially outward from the lower end of a central tubular extension conduit 24 telescopingly fitted inside the lower end of the upper housing conduit section 14A, as shown in FIGS. 2 and 4. A plurality of screws 26 join upper flange 23 through aligned holes in discs 19 and 21 to lower flange 22, and screws 26 are threaded into tapped holes in flange 22. Extension conduit 24 is anchored in telescopic engagement with upper housing section 14A by such means as a set screw 25, shown in FIG. 4, and thus the entire conduit assembly is rigidly connected together to form a single unitary poke-thru device.

INTUMESCENT FOAMING FIRE RETARDANT MATERIAL

Stacked above the radially protruding upper flange 23 are several thick washer-shaped discs of intumescent foaming fire retarding material 27 which complete the heat resistant and fire retardant assembly 16, as shown in FIGS. 2 and 4.

In the preferred embodiment, the lower end of the extension conduit 24 is provided with a plurality of cutaway portals 28, leaving a corresponding plurality of column flanges 29 depending from the body of extension conduit 24 at the lower end of this conduit. Flange 23 is provided with corresponding upstanding column tabs 31 spaced to coincide with the downwardly depending column flanges 29 of the extension conduit 24, and means such as the pop rivets 32 illustrated in FIG. 4 anchor the column tabs to the column flanges to secure flange 23 to the lower end of extension conduit 24, without obstructing the cut-away portals 28 which expose the interior of the hollow housing conduit assembly to the intumescent ring-shaped discs 27.

The isolation of the upper housing conduit portion 14A from the lower portion 14B by ceramic fiber block 21 minimizes conduction of heat upward through the device. Heat conduction is further retarded by the small cross-sectional area of column flanges 29 and overlapped column tabs 21.

The intumescent material employed is normally a sodium silicate composition capable of foaming upon application of heat and expanding to form a heat resistant and smoke and fire retardant barrier filling the hole 12. 3M Co. Fire Barrier Sheet "FS 195" and BASF Wyandotte "Palusol 210" are both approved by Underwriters' Laboratories as suitable intumescent materials. Portals 28 provide ample access for this foaming intumescent material 27 to expand inwardly into the interior of the hollow housing conduit assembly enclosing the internal raceway passage, embracing all electrical conductors therein and blocking or retarding the passage of fire, heat or smoke therethrough.

Resting on the upper surface of the topmost disc-shaped block or sheet of intumescent material 27 is a cap flange 33 on which rests the disc-shaped resilient slotted spring washer 18, as shown in FIG. 4.

A retaining ring 34 encircles extension conduit 24 just above spring washer 18, and is anchored in place on extension conduit 24 by a set screw 36. Retaining ring 34 secures spring washer 18 in position above cap flange 33, and retains the spring washer against displacement during downward insertion of the poke-thru device in hole 12 to the installed position shown in FIG. 2.

RESILIENT CAPTIVATING SPRING WASHER

FIGS. 3, 4 and 5 show plan and sectional side elevation views of the resilient dished slotted spring washer 18. As shown in FIG. 4, the internal diameter 36 of spring washer 18 is selected to accommodate and loosely embrace the outside diameter of the extension conduit 24 over which spring washer 18 fits in its installed position shown in FIG. 4. The circumference of spring washer 18 is severed by a radial slot 37, allowing the washer to flex and deform resiliently during installation, and permitting facing edges 35 defining radial slot 37 to overlap during the conical dish stamping operation which converts the flat washer blank shown in FIG. 3 to the dished washer of FIG. 4. Seven partial slots 38 preferably extend radially inward from the outer periphery of washer 38 at equal intervals around the circumference of washer 18. Spaced between slots 38 are broader "Y" shaped notches 39, and both slots 38 and notches 39 extend radially inward from the outer circumference of the spring washer 18 part way across its width toward its internal diameter 36.

Slots 38 and notches 39 thus subdivide the outer periphery of spring washer 18 into a plurality of tabs 40 all integrally extending outward from an inner ring portion 41 extending around the inner periphery defined by the internal diameter 36, and interrupted only by the radial slot 37 passing across the entire width of washer 18 to make it a "C" shaped spring washer.

As shown in FIG. 4, the entire ring-shaped washer may be stamped into a conical configuration slanting upward in its installed position at an angle of 30° to 40° from the horizontal. Lesser angles, from about 10° to about 20° of conical deformation, may be formed by stamping the spring washer 18 during fabrication, and the internal ring portion 41 may have a slight conical upward slant while the outer tab portions 40 defined between the slots 38 and notches 39 may have a greater upward angular slant.

Thus, for example, as shown in FIG. 5, the internal split ring portion 41 may slant upward from the horizontal at an angle of approximately 10°, while the protruding tab portions 40 extending radially outward therefrom between slots 38 and notches 39 may slant upward at a greater angle, 20° from the horizontal for example. The notches 39 between pairs of tabs assure that tabs 40 angularly deformed upwardly by downward insertion of the poke-thru device into the hole 12 will have space to flex without conflicting with each other when they bend upward at a steeper slant during this insertion operation.

The overlapping of edges 35 defining slot 37 assures peripheral integrity of washer 18, centering loadings and equalizing stresses during installation, accommodating different sizes of holes 12 with ease.

In order to segregate communication cables from power cables inside the hollow housing conduit assembly forming the core passageway inside the poke-thru device 10, an elongated vertical partition 41 of plastic or fiberboard material may be inserted inside upper housing conduit section 14A, extension conduit 24 and lower housing conduit section 14B, thereby subdividing the entire internal passageway into two different elongated chambers. Such an elongated vertical partition 41 does not interfere with the exposure of each such chamber to the intumescent foaming material 27 through portals 28, and if heat or fire cause foaming of the intumescent material, this material spreads easily through portals 28 to block the entire internal cross-section of the passageway extending inside these housing sections.

It will thus be seen that objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A unitary insertable self-anchoring poke-thru wiring device for self-captivating anchored insertion in a standard concrete slab floor aperture, providing electrical communication wiring connections or plug-in receptacle power outlets in occupied spaces above the slab floor within a building comprising a tombstone outlet box whose minimum lateral dimension exceeds the maximum lateral dimension of the standard aperture, whereby a bottom face of the outlet box is dimensioned to overlie and conceal the standard aperture opening into an overlying occupied space, and the outlet box having electrical conductors extending downward therefrom, hollow elongated conduit means enclosing the extending electrical conductors, and having a first end joined to the bottom face of the outlet box and extending therefrom to a second end, the conduit means having a maximum lateral dimension substantially less than the minimum lateral dimension of the standard floor slab aperture, thus adapting the conduit means for insertion downward through the aperture, a narrow elongated junction box anchored to the second end of the conduit means, enclosing and presenting the electrical conductors for subsequent connections thereto, and having its maximum lateral dimension substantially less than the minimum lateral dimension of the standard floor slab aperture, whereby the junction box is dimensioned to pass lengthwise through the aperture, fire-retardant means centrally anchored to the hollow conduit means for positioning inside the aperture, a conically-dished resilient spring washer encircling the hollow conduit means adjacent to the fire retardant means and having its conical surface concavely diverging toward the outlet box face, with its periphery notched and dimensioned for wedging engagement in the standard aperture, and means anchoring the spring washer to prevent its displacement relative to the hollow conduit, whereby the poke-thru wiring device is adapted for unitary insertion from the occupied space into the standard aperture, wherein the resilient spring washer wedgingly engages the internal wall of the standard aperture retaining the wiring device captively installed therein, with the fire-retardant means spanning the standard aperture near its lower end, while the narrow elongated junction box depends therebeneath.

2. The poke-thru wiring device defined in claim 1, wherein the conically dished resilient spring washer has its notched periphery formed in the shape of angularly spaced slantingly raked protruding tabs, bent toward the outlet box face at an angle between about 10° and about 40°.

3. The poke-thru wiring device defined in claim 2, wherein the resilient raked protruding tabs are bent toward the outlet box face at an angle between about 20° and about 32°, and project to an outside diameter substantially greater than the nominal inside diameter of the standard aperture, whereby insertion of the device from the occupied space through the aperture bendingly deflects the tabs resiliently toward the outlet box, providing the wedging engagement retaining the wiring device captively installed in the aperture.

4. The poke-thru wiring device defined in claim 1, wherein fire-retardant means includes a centrally apertured ceramic fiber block encircling the electrical conductors, and wherein the hollow elongated conduit means is divided into two endwise aligned sections respectively provided with anchoring flanges embracing the fiber block and securely anchored together, forming a heat-insulating barrier retarding the conduction of heat along the device toward the outlet box.

5. The poke-thru wiring device defined in claim 4, wherein the fire-retardant means further includes at least one body of intumescent material positioned between the fiber block and the outlet box, whereby heat or smoke are blocked by foaming expansion of the intumescent material to fill the standard aperture.

6. The poke-thru device defined in claim 5, wherein the hollow conduit means is provided with portal openings facing the intumescent body, whereby foaming expansion advances the intumescent material into the interior of the conduit means to surround the electrical conductors therein, blocking the passage of smoke, gas or heat therethrough.

* * * * *